Patented Sept. 15, 1931

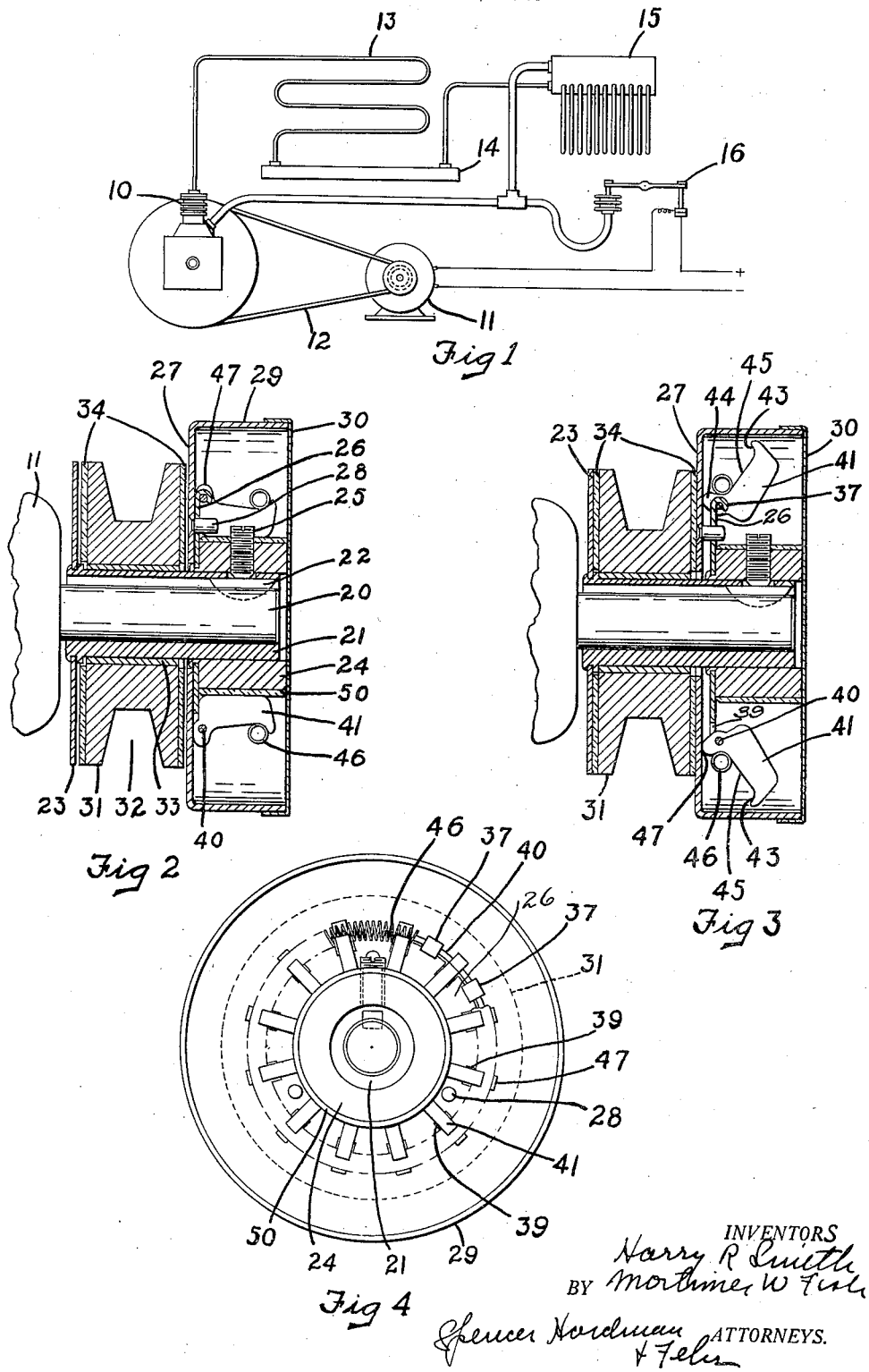

1,823,129

UNITED STATES PATENT OFFICE

HARRY R. SMITH AND MORTIMER W. FISH, OF DAYTON, OHIO, ASSIGNORS TO FRIGIDAIRE CORPORATION, OF DAYTON, OHIO, A CORPORATION OF DELAWARE

CLUTCH

Application filed February 29, 1928. Serial No. 257,991.

This invention relates to centrifugal clutches for connecting a motor to a load, particularly for connecting the motor to the compressor of a refrigerating system.

One of the objects of the invention is to provide a simplified form of clutch which is silent in operation.

Another object is to provide an improved clutch having a snap-acting actuating mechanism.

Further objects and advantages of the present invention will be apparent from the following description, reference being had to the accompanying drawings, wherein a preferred form of embodiment of the present invention is clearly shown.

In the drawings:

Fig. 1 is a diagrammatic representation of a refrigerating system in which our invention is intended to be used.

Fig. 2 is a section thru the improved clutch in the disengaged position.

Fig. 3 is a corresponding section thru the clutch in the power-transmitting position; and Fig. 4 is an end view of the clutch operating mechanism.

Referring to the drawings, 10 is a compressor which is driven by the motor 11 thru a belt 12 for circulating refrigerant thru the system comprising a condenser 13, receiver 14 and evaporator 15. The motor is actuated in response to refrigerating demand by an automatic switch 16.

In installations where alternating current is available it is very desirable from the standpoint of economy to be able to use a split phase motor. An objection to the use of this type of motor is that it has a low starting torque which is ordinarily insufficient to start a compressor, particularly in cases where the compressor has been idle for a considerable period of time and there is a high pressure in the crank case. For this reason it has been proposed to connect the motor to the compressor by means of a clutch which allows the motor to run idle when starting, and connects the motor to the load when the motor has reached full speed and consequently has developed a sufficient torque. Our invention is concerned with an improved type of clutch for use in the above-described system.

Referring to Figs. 2 and 3, 20 designates the shaft of the motor 11. A sleeve 21 is keyed to the shaft by a key 22, and has rigidly attached to it at its inner end a disc 23 which forms part of the driving portion of the clutch. A second sleeve or collar 24 which may have a resilient surface 50, as will be explained below is rigidly secured to the other end of the sleeve 21 by a set screw 25. A flange 26 is attached to the collar 24, and a second driving disc 27 is loosely mounted on the sleeve 21 between the flange 26 and the disc 23. The driving disc 27 carries pins 28 which slide axially in corresponding holes in the flange 26, this forming the driving connection between the collar 24 and disc 27. If desired the edge of the disc 27 may be formed into a flange or cylinder 29, to provide a housing for the centrifugal mechanism. A cover plate 30 may be secured to the housing.

A driven pulley 31, having a groove 32 for the belt 12 is rotatably mounted on the sleeve 21 between the driving discs. The pulley is provided with a friction reducing bushing or bearing 33 and end faces of friction material such as cork 34.

The flange 26, as will be seen from the end view (Fig. 4) is provided with radial lugs 37 and slots 39. The lugs form means for holding a circular wire 40 upon which are strung a number of weights 41 which are therefore pivoted on the wire so as to be rocked about the wire by centrifugal force produced by the rotation of the motor shaft. The weights are preferably mounted in the slots so as to be spaced at the desired intervals about the collar. Each of the weights has a shoulder 43 at one end and a shoulder 44 at the other end, between which extends a generally flat surface 45. A garter spring 46 surrounds the weights resting on the surfaces 45 to hold the weights toward the center, and is confined between the shoulders 43 and 44. The weights can be brought either to the position in Fig. 2 or the position in Fig. 3. In the position shown in Fig. 2 the inner sides of the weights are in contact with the surface 50 of the collar 24, while in the outer position shown in Fig. 3 the cam faces 47 on the weights are moved to the left and hold the disc 27 to the left to clamp the driven pulley between the two driving discs. As will be seen in Fig. 2 when the weights rest against the collar the surfaces 45 referred to are inclined so that they lie in the surface of a cone whose apex is to the right of the weights. We term this inclination negative.

As the motor shaft rotates the centrifugal force acting on the weights tends to throw them outward against the centripetal force exerted by the spring. The weights rocked about the wire get farther and farther away from the collar and it will be seen that at a certain critical speed the inclination of the surfaces changes sign and becomes positive, that is, the surfaces pass thru the position which is parallel with the axis of the shaft and incline in the opposite direction. The surfaces now lie in a cone whose apex is on the left hand side of the pivots. The garter spring, tending to contract, always rolls toward the apex of the cone until stopped by the shoulder. Consequently as the inclination of the surfaces changes sign, the garter spring suddenly rolls from shoulders 43 to shoulders 44 and suddenly decreases its moment of centripetal force about the pivots. This permits the weights to fly outward suddenly and move the disc 27 into driving engagement with the pulley. The sudden decrease in the moment of force of the spring provides a positive snap action to the clutch. However, it does not bring driving and driven members into a rigid engagement with a shock.

The parts are so proportioned that when the weights are in their outermost position the garter spring lies very close to the plane of the pivots, being slightly to the right of the pivots so as to be able to restore the weights to the innermost position when the motor stops or the speed falls below the critical value.

Since when the motor is slowing down, the spring rolls suddenly from shoulders 44 to shoulders 43 when the inclination of the surface 45 changes sign from positive to negative, the weights will be forced suddenly against the collar 24. For this reason we prefer a collar having a resilient surface, which may be provided by a layer of resilient or shock absorbing material such as soft rubber 50 around the collar to absorb the shock of the impact of the weights and to prevent any undesirable noise in operation.

While the form of embodiment of the present invention as herein disclosed, constitutes a preferred form, it is to be understood that other forms might be adopted, all coming within the scope of the claims which follow.

What is claimed is as follows:

1. A clutch comprising in combination rotatable driving means, rotatable driven means, and means for connecting the driving and driven means in power transmitting relation only when the driving means is rotating above a critical speed including a plurality of weights mounted on the driving means and arranged to be rocked by centrifugal force, surfaces on the weights and spring means exerting centripetal force on the surfaces, the parts being so constructed and arranged that the spring means automatically acts upon different portions of the surfaces above and below the critical speed.

2. A clutch comprising in combination rotatable driving means, rotatable driven means, and means for connecting the driving and driven means in power transmitting relation only when the driving means is rotating above a critical speed including a plurality of weights mounted on the driving means and arranged to be rocked by centrifugal force, said weights having surfaces lying in a cone whose apex is on one side of the weights below the critical speed and a garter spring surrounding the weights and engaging said surfaces, the parts being so constructed and arranged that above the critical speed the surfaces lie in a cone whose apex is on the other side of the weights and the spring rolls along the surfaces to change its moment of force on the weights.

3. A clutch comprising in combination rotatable driving means, rotatable driven means, and means for connecting the driving and driven means in power transmitting relation only when the driving means is rotating above a critical speed including a plurality of weights mounted on the driving means and arranged to be rocked by a centrifugal force, the weights having surfaces inclined in a negative direction below the critical speed, a shoulder on each weight at each end of the surfaces and a garter spring engaging the surfaces and confined between the shoulders, the parts being so constructed and arranged that at the critical speed the inclination of the surfaces changes sign and the spring rolls suddenly from one shoulder to the other.

4. A clutch comprising in combination rotatable driving means, rotatable driven means, and means for connecting the driving and driven means in power transmitting relation only when the driving means is rotating above a criticel speed including a plurality of weights mounted on the driving means and arranged to be rocked by centrifugal force, spring means exerting centripetal force on the weights, the parts being constructed and arranged so that the moment of the force of the spring means about the rocking points of the weights decreases above the critical speed, and a shock absorbing abutment for the weights below the critical speed.

5. A clutch comprising in combination rotatable driving means, rotatable driven means, and means for connecting the driving and driven means in power transmitting relation only when the driving means is rotating above a critical speed including a plurality of weights mounted on the driving means and arranged to be rocked by centrifugal force, spring means exerting centripetal force on the weights, the parts being constructed and arranged so that the moment of the force of the spring means about the rocking points of the weights decreases above the critical speed, said connecting means including a pair of discs which rotate together and are slidable to and from each other, and a pulley adapted to be clamped between the driving discs.

6. A clutch comprising in combination rotatable driving means, rotatable driven means, and means for connecting the driving and driven means in power transmitting relation only when the driving means is rotating above a critical speed including a plurality of weights mounted on the driving means and arranged to be rocked by centrifugal force, spring means exerting centripetal force on the weights, the parts being constructed and arranged so that the moment of the force of the spring means about the rocking points of the weights decreases above the critical speed, said connecting means including a disc having a flange at its edge forming a housing, said housing enclosing the mechanism for holding the driving and driven members in engagement with each other.

In testimony whereof we hereto affix our signatures.

HARRY R. SMITH.
MORTIMER W. FISH.